June 2, 1942.  G. R. G. GATES  2,284,974

HYDRAULIC BRAKING SYSTEM

Filed March 9, 1939  2 Sheets-Sheet 1

INVENTOR.
Geoffrey R. G. Gates
BY Jerome R. Cox.
ATTORNEY.

June 2, 1942.                G. R. G. GATES                 2,284,974
                        HYDRAULIC BRAKING SYSTEM
                         Filed March 9, 1939            2 Sheets-Sheet 2

INVENTOR.
Geoffrey R. G. Gates.
BY Jerome R. Cox.
ATTORNEY.

Patented June 2, 1942

2,284,974

UNITED STATES PATENT OFFICE 2,284,974

HYDRAULIC BRAKING SYSTEM

Geoffrey Robert Greenbergh Gates, London, England, assignor to Automotive Products Company Limited, London, England Application March 9, 1939, Serial No. 260,830
In Great Britain March 12, 1938

8 Claims. (Cl. 60—54.5)

This invention relates to master cylinder units for liquid pressure power transmission systems of the kind in which two or more motor units or sets of units are operated by pressure generated in mutually isolated pressure spaces in a single master cylinder unit having a main piston operated by external means, and a floating piston or floating pistons separating the pressure spaces.

The object of the invention is to provide an improved construction of a cylinder of this kind.

According to the invention regarded broadly, the master cylinder unit comprises a main cylinder bore, one auxiliary bore in parallel side-by-side relation to the main bore, an externally operable piston in the main bore, a floating piston in the auxiliary bore, the main piston and the floating piston delivering liquid each to one or more motor units, and the floating piston being operated by pressure produced by the main piston, the said pressure acting directly on the rear face of the operated piston. Thus, according to the invention, a master cylinder unit is provided which works in the manner of a tandem master cylinder to supply a number of mutually independent branches of a liquid pressure system, the cylinder in this case being of U-shape, one of the limbs to accommodate the main piston, and the other to accommodate a floating piston. A rocker is preferably mounted on the end of the cylinder unit between the auxiliary bore and the bore containing the piston by which liquid pressure is supplied to actuate the floating piston in said auxiliary bore, said pressure supplying piston engaging the rocker on moving beyond its normal stroke, and transmitting movement mechanically through the rocker to said floating piston. The rocker may be mounted in a liquid passage connecting the two cylinder bores.

The invention is more particularly applicable to the brake system of road vehicles, and an embodiment of the invention in a master cylinder unit for that purpose will now be described with reference to the accompanying drawings in which.

Figure 1:
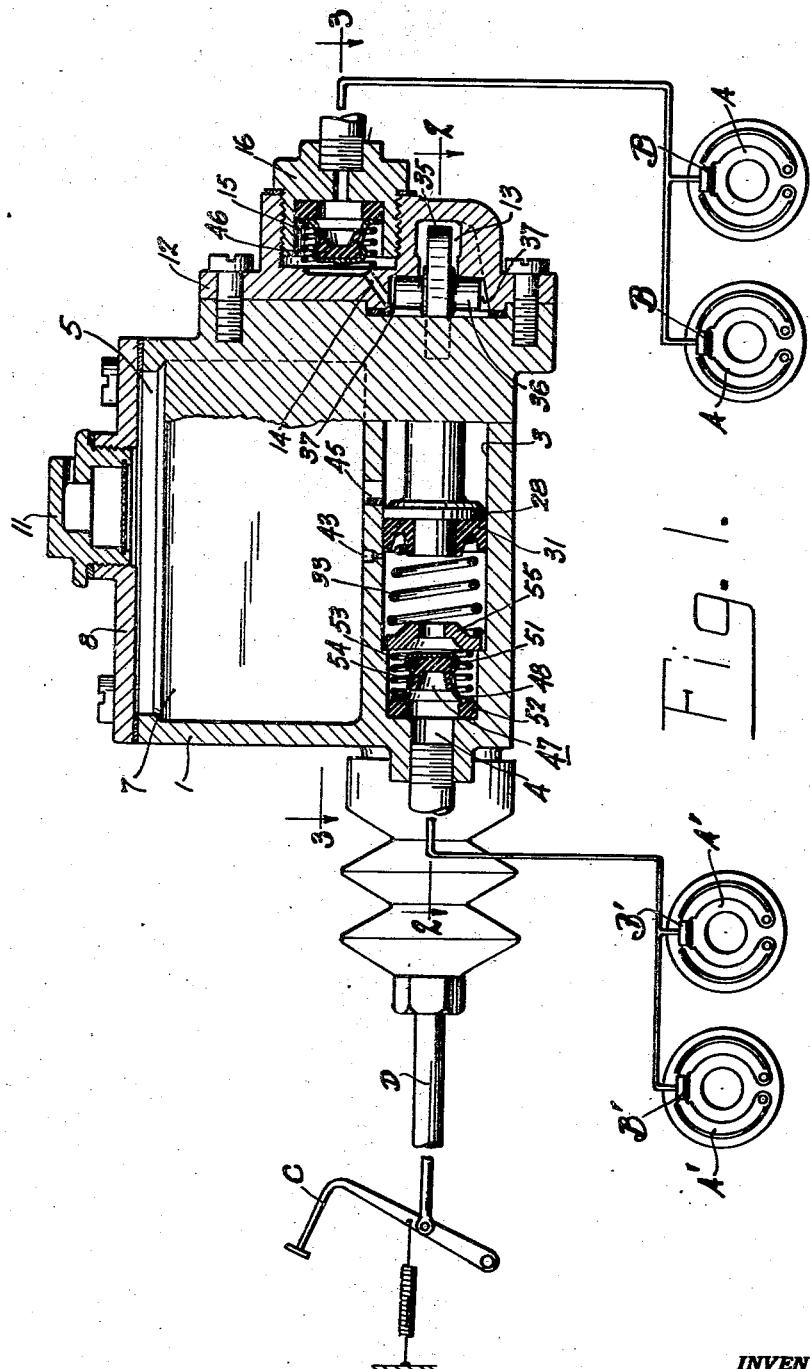
Figure 1 is a sectional elevation of a master cylinder according to the invention, the section being taken on the line 1—1 of Figure 2, and the brake system to which the master cylinder is connected being diagrammatically indicated.
Figure 2:
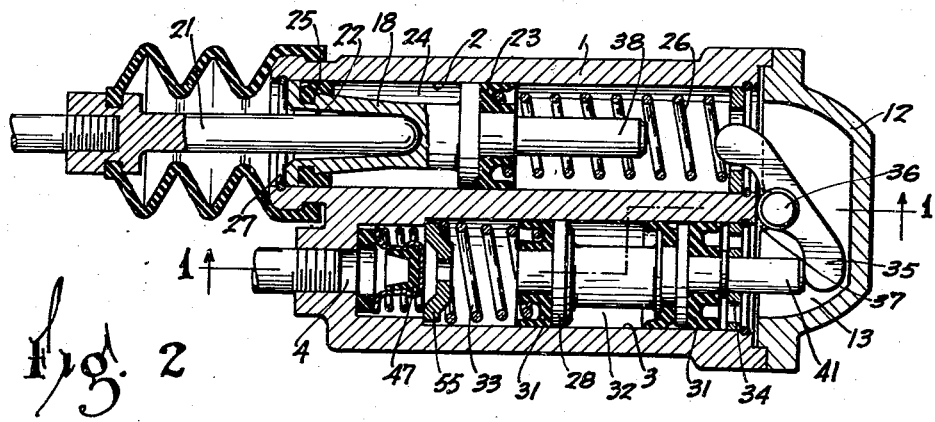
Figure 2 is a sectional plan on the line 2—2 of Figure 1.
Figure 3:
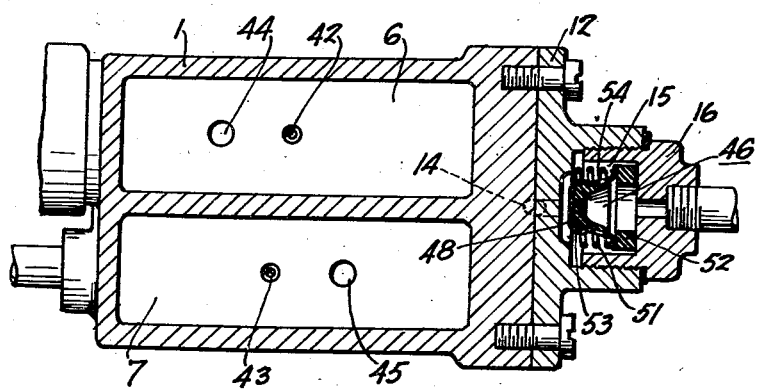
Figure 3 is a sectional plan on the line 3—3 of Figure 1.

The embodiment of the invention described is for the operation of brakes on a four-wheeled vehicle, having liquid pressure operated brakes on all four wheels, the brakes being diagrammatically indicated in Figure 1 at A, A, A¹, A¹, with motor cylinders B, B, B¹, B¹, by which the shoes are expanded. The master cylinder unit is operated by a pedal C and rod D.

The master cylinder unit comprises a casting 1 having formed in its lower part a main bore 2 and an auxiliary bore 3 in parallel side-by-side relation. The main bore is open at both ends, the auxiliary bore being open at one end only and closed at the other end except for a passage 4 suitably threaded to receive a pipe union.

Above the cylinder bores 2 and 3 is a reservoir space 5 divided into two sections 6 and 7 to provide an independent liquid supply for each of the two cylinder bores, the reservoir space being closed by a top plate 8 fitted with a detachable filling cap 11. On the end of the cylinder unit at which both bores 2 and 3 are open is fitted a cover plate 12 having in its face which abuts against the end of the master cylinder unit a cavity 13 forming a connecting passage between the two bores. Connected to this cavity 13 by a passage 14 is an outwardly directed recess 15 into which is threaded a plug 16 adapted to receive a pipe union.

In the main bore 2 is fitted a piston 18 operable by a thrust rod 21 extending into a recess 22 in the rear end of the piston, the thrust rod being coupled at its other end to the foot pedal C by the rod D. The piston 18 carries a packing 23 of the cup washer type at its forward end, and is reduced in diameter behind its head to form an annular space 24 closed at its rear end by a second packing 25. The piston is urged by a spring 26 inside the cylinder away from the connected ends of the two cylinders, and is limited in its movement in that direction by a circlip 27 in the end of the cylinder bore. In the auxiliary bore 3 is fitted a floating piston 28 having an outwardly facing cup washer packing 31 at each end, and having a central part of reduced diameter to form an annular space 32. This piston is urged by a spring 33 against a suitable stop 34 in the end of its cylinder which communicates with the main cylinder 2.

In the cavity 13 of the cover plate 12 which connects the two cylinder bores 2 and 3 is mounted a rocker 35 comprising a lever mounted between its ends on a pin 36 fitting in two notches 37 in the sides of the cavity 13, and held therein by the end face of the main casting. An abutment 38 is carried by the main piston 18 and is adapted to engage one end of the rocker 35 after a predetermined stroke of the main piston. An abutment 41 on the floating piston engages the other end of the rocker 35, this abutment 41 being in engagement with or only very slightly spaced from the rocker 35 when the floating piston is fully retracted.

The usual provision is made for the cylinder spaces in front of the two pistons 18 and 28 to be connected to the reservoir spaces 6 and 7 when the pistons are fully retracted, by means of the small apertures 42, 43 in the cylinder walls, these apertures being covered by the initial movement of the piston cups. The annular spaces 24, 32 around the pistons are permanently connected to the reservoir spaces by larger ports 44 and 45. In the outlet from the connecting cavity 13 and the outlet 4 from the auxiliary cylinder 3 are provided two-way valves 46 and 47 which permit free passage of liquid out of the cylinders, but permit return flow only when the pressure in the pipe lines exceeds a small predetermined amount, so that a slight pressure is always maintained in the pipe lines.

These valves consist of a metal cup-shaped member 48 urged by a spring 51 against a packing ring 52, and a rubber cup member 53 fitted inside the metal cup 48, the skirt of the cup 53 covering a series of apertures 54, in the wall of the metal cup 48. Liquid can thus pass freely out of the master cylinder unit by pushing aside the skirt of the cup 53, but cannot return thereto except by lifting the cup 48 from the ring 52 against the spring 51. A pressure is therefore always maintained in the pipe lines, this pressure being equal to the load of the springs 51.

From the outlet from the connecting cavity 13 between the cylinders 2 and 3, a pipe line extends to the motor cylinders B, B operating the shoes or equivalent members of the rear brakes A, A, and from the outlet 4 from the auxiliary cylinder 3 extends a pipe line to the motor cylinders $B^1$, $B^1$ operating the shoes or equivalent members of the front brakes $A^1$, $A^1$.

Pressure on the pedal C causes the main piston 18 to move forward in its cylinder 2, forcing liquid into the pipe line leading to the rear brakes A, A, and also forcing liquid through the connecting cavity 13 into the auxiliary cylinder 3, where it causes the floating piston 28 to move in the opposite direction to the main piston 18, and expel liquid to the motor cylinders $B^1$, $B^1$, of the front brakes. All the brakes are thus applied with exactly equal pressure.

Should the rear brake system fail, due to breakage of a pipe line or failure of a packing member, and liquid leak away, the main piston 18 when operated, moves forward until the abutment 38 thereon strikes the rocker 35 and turns the rocker about its pivot 36 mechanically to operate the floating piston 28, through its abutment member 41. Should failure take place in the front brake system, the floating piston 28 is moved forward until it strikes an abutment 55, and further movement of the main piston creates pressure in the rear brakes.

The master cylinder unit according to the present invention has the advantages over the corresponding form of master cylinder having only a single bore, that for a given stroke it is shorter in length and can be arranged with both outlets at the ends, so that it can be secured to either a left hand or a right hand supporting face, which is not the case if one outlet is in the side of the cylinder, as in the single bore type cylinder.

It is to be understood that the above described embodiments of my invention are for the purpose of illustration only and various changes may be made therein without departing from the spirit and scope of the invention.

I claim:

1. A master cylinder unit, comprising a main cylinder bore, a piston therein, an auxiliary bore, a floating piston therein, a plurality of motor units one of said units being connected to the main bore and a separate unit being connected to the auxiliary bore, an end cover secured to the end of the master cylinder unit and having a liquid passage therethrough connecting the main and auxiliary bores, and mechanical means adapted to at times connect the main and auxiliary pistons, said means including a rocker mounted in the aforesaid liquid passage connecting the bores.

2. A master cylinder unit, comprising a main cylinder bore, a piston therein, an auxiliary bore, a floating piston therein, a plurality of motor units one of said units being connected to the main bore and a separate unit being connected to the auxiliary bore, an end cover secured to the end of the master cylinder unit and having a liquid passage therethrough connecting the main and auxiliary bores, and a rocker at times contacting the main and auxiliary pistons, the said rocker being journalled in notches formed in the sides of the connecting liquid passage in the end cover, the said notches being closed by the adjacent face of the main body of the cylinder unit.

3. A master cylinder unit for a liquid pressure power transmission system, comprising a main cylinder bore, a motor unit, a conduit connecting said main cylinder bore to said motor unit, an auxiliary cylinder bore in parallel relation to the main bore, a second motor unit, a conduit connecting said auxiliary bore to said second motor unit, an externally operable piston in the main bore, and a floating piston in said auxiliary bore, the main piston and the floating piston delivering liquid through said conduits to the first and second motor units respectively, hydraulic means for actuating the floating piston in response to actuation of the externally operable piston, and mechanical means for actuating the floating piston in response to actuation of the externally operable piston, said mechanical means including a rocker mounted in a liquid passage connecting the cylinder bores.

4. A master cylinder unit for a liquid pressure power transmission system, comprising a main cylinder bore, a motor unit, a conduit connecting said main cylinder bore to said motor unit, an auxiliary cylinder bore in parallel relation to the main bore, a second motor unit, a conduit connecting said auxiliary bore to said second motor unit, an externally operable piston in the main bore, and a floating piston in said auxiliary bore, the main piston and the floating piston delivering liquid through said conduits to the first and second motor units respectively, hydraulic means for actuating the floating piston in response to actuation of the externally operable piston, said hydraulic means including pressure liquid and a chamber therefor connected to both the main and auxiliary bores, and mechanical means for actuating the floating piston in response to actuation of the externally operable piston, said mechanical means including a rocker mounted in the aforesaid chamber connecting the cylinder bores.

5. A master cylinder unit for a liquid pressure power transmission system, comprising a main cylinder bore, a motor unit, a conduit connecting said main cylinder bore to said motor unit, an auxiliary cylinder bore in parallel relation to the main bore, a second motor unit, a conduit connecting said auxiliary bore to said second motor unit, an externally operable piston in the main bore, and a floating piston in said auxiliary bore, the main piston and the floating piston delivering liquid through said conduits to the first and second motor units respectively, primary means for actuating the floating piston in response to actuation of the externally operable piston, said primary means including pressure liquid and an end plate for the master cylinder unit having a fluid passage therein connecting said bores, and mechanical means for actuating the floating piston in response to actuation of the externally operable piston.

6. A master cylinder unit for a liquid pressure power transmission system, comprising a main cylinder bore, a motor unit, a conduit connecting said main cylinder bore to said motor unit, an auxiliary cylinder bore in parallel relation to the main bore, a second motor unit, a conduit connecting said auxiliary bore to said second motor unit, an externally operable piston in the main bore, and a floating piston in said auxiliary bore, the main piston and the floating piston delivering liquid through said conduits to the first and second motor units respectively, primary means for actuating the floating piston in response to actuation of the externally operable piston, said primary means including pressure liquid and an end plate for the master cylinder unit having a fluid passage therein connecting said bores, and mechanical means for actuating the floating piston in response to actuation of the externally operable piston, said mechanical means including a rocker mounted in the liquid passage connecting the cylinder bores.

7. A master cylinder unit comprising a main cylinder bore, a piston therein, an auxiliary bore, a floating piston therein, a plurality of motor units, one of said units being connected to the main bore and a separate unit being connected to the auxiliary bore, an end cover secured to the end of the master cylinder unit and having a liquid passage therethrough connecting the main and auxiliary bores, the said end cover carrying also the outlet connection from the main cylinder bore, and means for mechanically connecting the main and auxiliary pistons including a rocker mounted in the liquid pasasge connecting the bores.

8. In a fluid pressure system having a plurality of motor units, a master cylinder unit comprising a main cylinder bore, a main piston therein, an auxiliary bore, an auxiliary piston therein, a connection between one of the motor units and the main bore, a connection between a separate unit and the auxiliary bore, hydraulic means for actuating the auxiliary piston in response to actuation of the main piston, and mechanical means for actuating the auxiliary piston in response to actuation of the main piston, said mechanical means including a rocker mounted in a liquid passage connecting the cylinder bores.

GEOFFREY ROBERT GREENBERGH GATES.